(12) United States Patent
Kreutzer et al.

(10) Patent No.: US 11,298,789 B2
(45) Date of Patent: Apr. 12, 2022

(54) METHOD AND DEVICE FOR DETERMINING AND/OR MONITORING THE STATE OF A PROTECTIVE COVER

(71) Applicant: ARNO ARNOLD GMBH, Obertshausen (DE)

(72) Inventors: Thomas Kreutzer, Darmstadt (DE); Wolf-Matthias Mang, Obertshausen (DE)

(73) Assignee: ARNO ARNOLD GMBH, Obertshausen (DE)

( * ) Notice: Subject to any disclaimer, the term of this patent is extended or adjusted under 35 U.S.C. 154(b) by 306 days.

(21) Appl. No.: 16/477,059

(22) PCT Filed: Jan. 16, 2018

(86) PCT No.: PCT/EP2018/050933
§ 371 (c)(1),
(2) Date: Jul. 10, 2019

(87) PCT Pub. No.: WO2018/134176
PCT Pub. Date: Jul. 26, 2018

(65) Prior Publication Data
US 2019/0337108 A1 Nov. 7, 2019

(30) Foreign Application Priority Data
Jan. 20, 2017 (DE) .................... 10 2017 101 079.3

(51) Int. Cl.
B23Q 11/08 (2006.01)
B23Q 17/00 (2006.01)
F16P 3/02 (2006.01)

(52) U.S. Cl.
CPC ...... *B23Q 11/0891* (2013.01); *B23Q 11/0816* (2013.01); *B23Q 11/0825* (2013.01); *B23Q 17/008* (2013.01); *F16P 3/02* (2013.01)

(58) Field of Classification Search
CPC ............ B23Q 11/0891; B23Q 11/0816; B23Q 11/0825; B23Q 17/008; F16P 3/02
(Continued)

(56) References Cited

U.S. PATENT DOCUMENTS

2014/0150533 A1* 6/2014 Ono ..................... G01M 3/3272
73/46
2014/0341671 A1* 11/2014 Sato ................... B23Q 11/0825
409/134
(Continued)

FOREIGN PATENT DOCUMENTS

CN 201505837 U 6/2010
CN 102109010 A 6/2011
(Continued)

OTHER PUBLICATIONS

English translation of International Preliminary Report on Patentability dated Aug. 1, 2019 in connection with PCT/EP2018/050933.
(Continued)

*Primary Examiner* — Kerri L McNally
(74) *Attorney, Agent, or Firm* — Quarles & Brady LLP (57) ABSTRACT

A method for determining and/or monitoring the state of a protective cover, includes the steps of
a) obtaining a first state value of at least one characteristic physical, mechanical and/or chemical property of the protective cover at a first point in time; and
b) obtaining a second state value of the at least one characteristic property of the protective cover at a second point in time, which is to subsequent to the first point in time; and
c) comparing the obtained state values; and
d) determining the state of the protective cover based on the comparison performed in step c).

16 Claims, 4 Drawing Sheets

(58) Field of Classification Search
USPC .................................................. 73/865.8
See application file for complete search history.

(56) References Cited

U.S. PATENT DOCUMENTS

| | | | |
|---|---|---|---|
| 2014/0347655 A1 | 11/2014 | Jurca | |
| 2016/0178432 A1* | 6/2016 | Masakawa | B23Q 11/0085 |
| | | | 250/216 |
| 2017/0144262 A1* | 5/2017 | Okuda | B23Q 11/005 |

FOREIGN PATENT DOCUMENTS

| | | | | |
|---|---|---|---|---|
| CN | 105973586 A | 9/2016 | | |
| CN | 205719526 U | 11/2016 | | |
| DE | 3907419 A1 | 9/1990 | | |
| DE | 69101832 T2 | 9/1994 | | |
| DE | 19905071 A1 | 8/2000 | | |
| DE | 100 24 316 A1 | 11/2001 | | |
| DE | 10 2006 033607 A1 | 1/2008 | | |
| DE | 10 2010 011475 A1 | 9/2011 | | |
| DE | 102010011475 A1 | 9/2011 | | |
| DE | 102010011475 A1 * | 9/2011 | ................ | F16P 3/12 |
| DE | 20 2012 008 987 U1 | 12/2012 | | |
| DE | 10 2013 224 048 A1 | 6/2014 | | |
| DE | 10 2013 008 645 B3 | 8/2014 | | |
| DE | 10 2016 121711 A1 | 5/2017 | | |
| EP | 0 495 259 B1 | 4/1994 | | |
| JP | H09314437 A | 12/1997 | | |
| JP | H11221735 A | 8/1999 | | |
| JP | 2000052183 A | 2/2000 | | |
| JP | 2002160140 A | 6/2002 | | |
| JP | 2010155325 A | 7/2010 | | |
| JP | 2014109508 A | 6/2014 | | |
| JP | 2015093367 A | 5/2015 | | |
| JP | 2018027576 A | 2/2018 | | |

OTHER PUBLICATIONS

China National Intellectual Property Administration, Second Office Action, Application No. 201880017638.2, dated Jun. 29, 2021, 16 pages.
International Search Report and Written Opinion dated Apr. 19, 2018 in connection with PCT/EP2018/050933.
Japan Patent Office, Notification of Reason(s) for Refusal, Application No. P2019-538610, dated Apr. 1, 2021, 10 pages.
China National Intellectual Property Administration, First Office Action and Search Report, Application No. 201880017638.2, dated Nov. 24, 2020, 18 pages.
Japan Patent Office, Notification of Reason(s) for Refusal, Application No. P2019-538610, dated Jan. 6, 2022, 7 pages.

* cited by examiner

METHOD AND DEVICE FOR DETERMINING AND/OR MONITORING THE STATE OF A PROTECTIVE COVER

This application represents the national stage entry of PCT International Application No. PCT/EP2018/050933 filed Jan. 16, 2018, which claims priority of German Patent Application No. 10 2017 101 079.3, filed Jan. 20, 2017, the disclosures of which are incorporated by reference here in their entirety for all purposes.

The disclosure relates to a method and to a device for determining and/or monitoring the state of a protective cover according to the preambles of the independent claims.

Protective covers are known from the state of the art and are used in particular, but by no means exclusively, to cover moving machine parts or the like. Protective covers of this kind typically have length-adjustable elements to cover machine parts both in the extended and in the retracted state. Thus, the machine parts are not only protected against external influences, such as chips, dust particles or other pollution, but can also be sealed against the environment. DE 10 2006 033 607 B4 and DE 20 2012 008 987 U1 are to be noted as examples.

Typically, the length-adjustable elements of the protective cover are connected to a support frame, which stabilizes and in particular supports them. A support frame, in turn, comprises multiple frame elements, which are distributed at regular intervals across the length of the elements of the protective cover and which can also be connected to the elements. The connection of the support frame and/or of the frame elements to the elements of the protective cover serves to ensure the functionality and/or the protective function of the protective cover.

To maintain the functionality and/or the protective function of the protective cover, monitoring of the state of the protective cover, such as in terms of wear and/or an advancing age, which is typically to accompanied by the loss of functionality of the protective cover, a partial or complete failure of the protective cover and/or a loss of the protective function of the protective cover, is important. However, monitoring of this kind has not yet been realized in the protective covers known from the state of the art, which means that in the event of a loss of functionality and/or of the protective function of the protective cover, the protective cover will require unscheduled repair and/or maintenance, and standstill of the machine will occur. A partial or complete failure of the protective cover or of an element of the protective cover poses an even bigger problem. Furthermore, the fact that the precision of operation tends to deteriorate drastically when the protective cover wears, in particular in the case of creeping wear of the guide and/or of the drive, for example, is problematic. Disadvantageously, the timing cannot be predicted and/or planned. As a consequence, it may become necessary to replace the entire protective cover instead of repairing the elements that require repair and/or maintenance in due time and at little cost. Understandably, maintenance and full replacement is very expensive and time-consuming in comparison.

Hence, there is great demand for a method and for a device for determining and/or monitoring the state of a protective cover by means of which quick, reliable and precise determination and/or monitoring of a change in the characteristic physical, mechanical and/or chemical property of the protective cover is ensured in order to predict partial or complete replacement of the protective cover in due time. Additionally, the method and the device should be cost effective in term of implementation, work reliably and be individually adaptable to the protective cover to be monitored. Hence, the object of the disclosure is to provide a method and a device for determining and/or monitoring the state of a protective cover in order to overcome the difficulties mentioned above and especially to ideally plan the maintenance-related and/or repair-related work so as to keep downtimes of the machine and to the accompanying costs to a minimum.

This object is attained in a surprisingly simple but effective manner by a method for determining and/or monitoring the state of a protective cover and by a corresponding device according to the teaching of the independent claims.

The disclosure proposes a method for determining and/or monitoring the state of a protective cover that comprises the following steps:
 a) obtaining a first state value of at least one characteristic physical, mechanical and/or chemical property of the protective cover at a first point in time; and
 b) obtaining a second state value of the at least one characteristic property of the protective cover at a second point in time, which is subsequent to the first point in time; and
 c) comparing the obtained state values; and
 d) determining the state of the protective cover based on the comparison performed in step c).

The method according to the disclosure is based on the idea that in order to determine and/or monitor the state of a protective cover, it suffices to obtain at least two state values of at least one characteristic physical, mechanical and/or chemical property of said protective cover, in particular at two subsequent points in time, and to determine and/or monitor the state of the protective cover with sufficient precision based on a comparison of these state values.

In connection with the disclosure, it was found that in order to determine and/or monitor the state of the protective cover, it suffices to register the change in at least one characteristic property of the protective cover over the duration of use, wherein it does not matter whether the property is a physical, mechanical and/or chemical property of the protective cover. The only relevant aspect is that two state values of the same characteristic property are obtained at two subsequent points in time and are compared with each other, the state of the protective cover being determined and/or monitored based on the comparison of said state values. Preferably, the change in one characteristic property of the protective cover is registered; more preferably the change in 2, 3, 4, 5, 6, 7, 8, 9, 10, 11, 12, 13, 14, 15, 16, 17, 18, 19, 20 or more characteristic properties of the protective cover is registered. A change in the characteristic property can preferably be an improvement and/or deterioration thereof.

The term "characteristic property" refers to a property that is characteristic of the material used, the purpose, the operation site and/or the conditions of use of the protective cover and by means of which a direct or indirect conclusion as to the state of the protective cover can be drawn. For example, the impermeability of a protective cover is substantial in a dust-proof and/or moisture-proof protective cover. It is important that the characteristic property, in particular its change over time, preferably the operating time, the service life and/or the downtime, is examined, known and/or defined with sufficient accuracy. This means that the functional correlation between the change of the characteristic property and time is known and/or defined. For example, but by no means exclusively, the functional correlation can be mapped over time as a trend having a state value pattern in a function, such as in a linear function, in a logarithmic function, in an exponential function, in a logistic function, in a polygonal function and/or in a combination thereof.

In connection with the disclosure, it was found to be substantial that the first and second state values of the same characteristic property or properties are detected. The state values of the characteristic property may also be registered in combination with at least one other value for a factor that relates to the material used, to the purpose, to the operation site and/or to the conditions of use of the protective cover, more preferably with values for 2, 3, 4, 5, 6, 7, 8, 9, 10, 11, 12, 13, 14, 15, 16, 17, 18, 19, 20 or more factors. The reason for this is that a characteristic property depends on and/or is influenced by different factors, whose additional registration helps improve determination and/or monitoring. For example, temperature, pressure and/or humidity may be considered in this context, which can have an effect on the characteristic properties of the protective cover.

The term "method for determining and/or monitoring the state of a protective cover" refers to a method for determining the change, preferably an improvement and/or deterioration, of the characteristic physical, mechanical and/or chemical property of the protective cover over time, preferably the operating time, the service life and/or the downtime, by means of which a conclusion as to damage, maintenance, failure, repair, age, wear and/or remaining useful life of the protective cover can be drawn. Moreover, the conditions and/or influences under which aging of the protective cover proceeds or is decelerated can be tracked. Moreover, the occurrence and/or the cause of damage can be identified, which allows ideal planning and/or prediction of an imminent maintenance interval. The method according to the disclosure can comprise additional steps that come after or between the explicitly listed essential steps a) to d). Preferably, the method can be automated.

The term "protective cover" refers in particular, but by no means exclusively, to a cover of moving machine parts or the like. In connection with the disclosure, the term refers to the entire protective cover, a part thereof and/or at least one element thereof.

The term "determining the state" of the protective cover refers to the act of determining the state based on the at least one characteristic physical, mechanical and/or chemical property obtained of the protective cover, which preferably takes place using a suitable means. Determination preferably takes place semi-quantitatively, quantitatively, directly and/or indirectly. Direct determination refers to, for example, registering a state of the characteristic property of the protective cover based on a signal and/or value that is derived directly from the protective cover. A signal and/or value of this kind can be obtained in different ways, such as by obtaining at least one physical, mechanical and/or chemical property of the protective cover using means known from the state of the art.

Indirect determination refers to, for example, registering a signal and/or value of the characteristic property of the protective cover that is obtained via an additional or secondary component.

The term "monitoring the state" refers to the tracking and/or prediction of the determined state of the at least one characteristic physical, mechanical and/or chemical property of the protective cover. Monitoring can be displayed numerically and/or graphically, for example, but by no means exclusively. To increase the monitoring accuracy, monitoring preferably takes place at multiple points in time and/or permanently. The advantage of longer monitoring is that it also allows improved prediction of the state of the protective cover.

The person skilled in the art understands that determination and/or monitoring generally cannot be 100 percent correct. The term thus relates to a statistically significant probability concerning the accuracy of the determination of the state and of the tracking and/or prediction of the determined state. The person skilled in the art can judge whether such a determination and/or monitoring is statistically significant by methods known in the professional field without taking an inventive step. For example, statistic evaluation tools, such as determining the confidence interval, the p value, the Student's t-test, the Mann-Whitney test, etc. are to be mentioned. The corresponding intervals are at least 90%, at least 95%, at least 97%, at least 98% or at least 99% correct. The p values are preferably 0.1, 0.05, 0.01, 0.005 or 0.0001. Preferably, determination of the state of the protective cover and/or monitoring of the determined state is at least 60%, at least 70%, at least 80%, at least 90% or at least 95% or at least 99% correct in connection with the disclosure.

The term "comparing" refers to the comparison of the state values with each other, in particular of the first and second state values of the at least one characteristic physical, mechanical and/or chemical property of the protective cover. It is understood that a comparison as applied here refers to a comparison of corresponding parameters and/or values. For instance, a first absolute state value may be compared with a second absolute state value while a relative value of the first state value may be compared with a relative value of the second state value. Furthermore, an intensity signal of the first state value may be compared to an intensity signal of the second state value.

In connection with the disclosure, the comparison can be performed manually and/or with the aid of a computer. For a computer-aided comparison of the state values obtained in steps a) and b), for example, any means known to the person skilled in the art, such as a computer and/or a computer program, may be used. A computer program can additionally evaluate the result of the comparison by, for example, automatically rendering an assessment of the obtained state values. The comparison performed in step c) may be used to determine the state of the protective cover. Furthermore, steps c) and d) may be supported by an assessment, analysis and/or evaluation unit, for example. Preferably, the time at which the state value of the characteristic property of the protective cover is obtained is taken into account in the comparison, allowing a prediction as to how the state will change as a function of time to be made based on the comparison.

In connection with the disclosure, the comparison is preferably drawn between the first and second state values of the same characteristic property or properties of multiple protective covers, i.e. of 2, 3, 4, 5, 6, 7, 8, 9, 10, 11, 12, 13, 14, 15, 16, 17, 18, 19, 20 or more protective covers. It is understood that, primarily, the state of each individual protective cover is determined and/or monitored, but that multiple protective covers can also be compared with one another based on said comparison. This offers the advantage that the state of the protective cover is determined and/or monitored not only as a function of time, i.e. that not only a change over time of the first and second state values of the same characteristic property or properties of the same protective cover is determined and/or monitored, but that the state of the protective cover is also determined and/or monitored as a function of space, i.e. that a change of the first and second state values of the same characteristic property or properties of different protective covers is determined and/or monitored. In other words, this means that the comparison of the state values of the respective property or properties of protective covers disposed next to, below and/or above each other or of spatially separate protective covers is comprised. As the person skilled in the art will understand, the term "space/spatial" refers to the comparison of protective covers disposed immediately next to, below and/or above each other on the one hand and to protective covers disposed separately at any given distance from each other on the other hand. This means, for example, but by no means exclusively, that the protective covers are disposed spatially separate from each other within the space in which they are installed or operated. Additionally, this means, for example, but by no means exclusively, that protective covers may be disposed at different installation and/or operating sites, thus being spatially separate. The comparison as a function of space offers the advantage that, in this way, conclusions as to the change of the state of the protective covers can be drawn as a function of the respective conditions at the installation and/or operating site.

In connection with the disclosure, it is understood that the result of the comparison, i.e. the determination and/or evaluation of the state of the protective cover, depends directly or indirectly on the characteristic property. Thus, a small and nonsignificant change, a great and significant change and/or no change of the second state value in comparison with the first state value is indicative of a specific state. A change in the characteristic property can preferably be an improvement and/or deterioration. In this context, the result of the comparison may be output as a unit of time, such as in years, months, days, hours and/or minutes, as an absolute value and/or as a relative value.

In this context, the result of the comparison may be an extension of the unit of time of each individual protective cover which allows conclusions to be drawn as to the change in the characteristic property of the respective protective cover as a function of the conditions at the site of installation and/or operating site, for example. This offers the advantage that the condition influencing the characteristic property can be determined and/or monitored.

In connection with the disclosure, it should be considered that all obtained and/or determined values and a result of the determination and/or monitoring depend significantly on the material used, the purpose, the operation site and/or the conditions of use. The person skilled in the art is aware of this.

With the method according to the disclosure, the state of the protective cover can thus be determined and/or monitored easily and reliably in order to be able to assess the state of the protective cover, for example. In this way, the downtimes of a machine required for maintenance and/or repair can be ideally planned so as to avoid unnecessary downtimes and/or costs. Additionally, it is possible to only replace and/or repair the elements of the protective cover that require maintenance and/or repair, thereby saving significant amounts of cost.

Advantageous embodiments of the disclosure, which can be realized individually or in combination, are described in the dependent claims.

In an embodiment of the disclosure, the method may additionally comprise the step of e) displaying the determination performed in step d).

This embodiment allows the state of the protective cover to be displayed numerically and/or graphically in order to facilitate understanding of the determination in step d). A person skilled in the art knows suitable means for displaying an output of a value. For example, but by no means exclusively, a remaining useful life and/or a likelihood of failure of the protective cover can be displayed. Step e) can be supported by an output unit.

In another embodiment of the disclosure, an additional step b1) may be comprised after step d):

b1) obtaining a third state value of the at least one characteristic property of the protective cover at a third point in time, which is subsequent to the second point in time.

Said obtaining of a third state value offers the advantage that an improved approximation of the functional correlation of the characteristic property and thus a drastic improvement of the determination in step d) can be achieved. For example, but by no means exclusively, an improved assessment of the curvature of the function can be made, the accuracy of the determination in step d) increasing with a growing number of obtained state values.

Furthermore, the first state value of the characteristic property may be a reference value. In particular, but by no means exclusively, the reference value can be a fixed, obtained and/or theoretical value, such as a lab value and/or a database entry, and can be obtained prior to and/or during start-up of the protective cover. Furthermore, the reference value may define a threshold value, which is preferably defined as an upper limit of the normal value of the characteristic physical, mechanical and/or chemical property under different conditions. The value of the upper limit of the normal value can be determined through a variety of techniques well known to the person skilled in the art.

In another embodiment of the disclosure, the first, the second and/or the third state value may be obtained under substantially similar conditions. This significantly increases the accuracy of the determination and/or monitoring of the state of the protective cover, in particular through partial or complete exclusion of different factors on which the characteristic property depends and/or which influence the characteristic property. The term "substantially/essentially" similar means that only a slight, in particular insignificant, change in and/or deviation from the conditions occur while the state values are being obtained.

In yet another embodiment of the disclosure, the first, the second and/or the third state value may be obtained under different conditions. By obtaining the state values under different conditions, i.e. at differing conditions, the dependence of the characteristic property on and/or the influence on the characteristic property by different factors, such as temperature, pressure and/or humidity, can be determined.

In an embodiment of the disclosure, the characteristic property may be translucence, light absorption, light reflection, viscosity, acceleration, speed, elasticity, stiffness, temperature, moisture content, electrical conductivity, pressure force, compressive load, tensile load, pre-load, porosity, weight, brittleness, thickness and/or density. Additionally, other properties not listed here may be considered.

Furthermore, the state of the protective cover may be selected from the list of remaining useful life, state of health, wear, existence of damage and/or imminence of a maintenance interval.

The term "remaining useful life" relates to the determination of the remaining time for which the protective cover will maintain its functionality and/or protective function. By determining this value, one can additionally determine and/or monitor when the protective cover has to be serviced, repaired and/or replaced. Additionally, one can monitor how the functionality and/or protective function of the protective cover changes over time. The remaining useful life can preferably be displayed as a unit of time, such as in years, months, days, hours and/or minutes, and as a relative value.

The terms "state of health" and "wear" describe the determination of a maximum age, of the functionality and/or protective function of the protective cover and/or of the likelihood of failure of the protective cover, for example. These values allow conclusions to be drawn as to when maintenance, repair and/or replacement are expedient and/or necessary in order to ensure that the protective cover does not fail because of age, thus preventing an unplanned standstill of the machine. The state of health and/or wear can preferably be displayed as a unit of time, such as in years, months, days, hours and/or minutes, and as a relative value.

The term "existence of damage" relates to the determination of whether the protective cover is damaged or not. This may be determined based on a significant and/or atypical change in the functional correlation, in particular in the function, known and/or defined for the characteristic property. The existence of damage can preferably be displayed graphically and/or in the form of an absolute value.

The term "imminence of a maintenance interval" relates to the determination of the time that remains until the protective cover has to be serviced, repaired and/or replaced. Additionally, one can monitor how the functionality and/or protective function of the protective cover changes over time. The imminence of a maintenance interval can preferably be displayed as a unit of time, such as in years, months, days, hours and/or minutes, and as a relative value.

In yet another embodiment, the protective cover may comprise at least one length-adjustable protective cover element, a support frame, at least one frame element and/or a length-adjustable restraining element. Typically, the protective cover has at least one length-adjustable protective cover element in order to protect the machine parts against external influences, such as chips, dust particles or other pollution, and to seal it against the environment both in the extended state and in the retracted state. Furthermore, the protective cover element can be connected, in a detachable or permanent manner, for example, to a support frame, which serves to stabilize, in particular support, the protective cover. The support frame typically comprises at least one frame element, preferably multiple frame elements, which are typically distributed at regular intervals across the length of the protective cover elements of the protective cover. The frame elements can additionally each be part of a protective cover segment, which is in particular metallic, the protective cover segments engaging behind one another telescopically when the protective cover is being displaced. Moreover, the protective cover can have a restraining element, which is band-shaped or strip-shaped. The restraining element is length-adjustable and substantially stretches across the entire length of the protective cover including the protective cover element, the frame element and/or the support frame. When the protective cover is in the extended state, the length of the restraining element is at least slightly smaller than the maximum length of the protective cover, of the protective cover element, of the support frame and/or of the frame elements.

Moreover, the protective cover may additionally comprise an end frame which is suitable for attaching the protective cover to a machine or machine tool. Furthermore, the protective cover may have at least one guide rail, preferably multiple guide rails, which are configured in such a manner that at least one frame element can be movably mounted on them. Furthermore, other elements of the protective cover may be movably mounted on the guide rail.

The definitions and/or the explanations of the terms mentioned above are assumed to apply to all aspects described in the following description, unless otherwise indicated.

Furthermore, the disclosure proposes a device for determining and/or monitoring the state of a protective cover, the device comprising:
 a) a means for obtaining a first state value of at least one characteristic physical, mechanical and/or chemical property of the protective cover at a first point in time; and
 b) a means for obtaining a second state value of the at least one characteristic property of the protective cover at a second point in time, which is subsequent to the first point in time; and
 c) an evaluation unit for comparing the obtained state values; and
 d) an analysis unit for determining the state of the protective cover based on the comparison performed in item c).

The term "means for obtaining" refers to any means known to the person skilled in the art from the state of the art that is suitable for obtaining the characteristic physical, mechanical and/or chemical property of the protective cover at a point in time. Preferably, the point in time is registered at the same time.

The term "evaluation unit" refers to a unit that is suitable for comparing the obtained state values. Suitable evaluation units, such as a computer or a computer program, are known to the person skilled in the art. A computer program can additionally analyze the result of the comparison.

The term "analysis unit" refers to a unit that is suitable for analyzing or determining the state of the protective cover. The analysis unit is a computer and/or a computer program, for example.

Advantageous embodiments of the disclosure, which can be realized individually or in combination, are explained in the dependent claims.

In an embodiment of the disclosure, the device may additionally comprise
 e) an output unit for displaying the determination performed in item d).

The term "output unit" refers to a unit that is suitable for displaying the determined state. This embodiment allows the state of the protective cover to be displayed numerically and/or graphically so as to facilitate understanding of the determination in item d). A person skilled in the art knows a suitable output unit for displaying.

In another embodiment of the disclosure, the device may comprise an additional item b1) after item b):
 b1) a means for obtaining a third state value of the at least one characteristic property of the protective cover at a third point in time, which is subsequent to the second point in time.

A means of this kind for obtaining the third state value is known to the person skilled in the art.

Furthermore, the first state value of the characteristic property may be a reference value.

In an embodiment of the present disclosure, the means, the evaluation unit, the analysis unit and/or the output unit may be partially or fully integrated in the protective cover. In this way, best possible determination and/or monitoring of the state of the protective cover can be realized.

In an alternative embodiment, the means, the evaluation unit, the analysis unit and/or the output unit may be disposed outside the protective cover and may be rigged for contact or non-contact action. In this way, best possible determination and/or monitoring of the state of the protective cover can be realized.

In yet another embodiment of the disclosure, the means may be a counter mechanism, an operating time counter, an indicator, a sensor and/or a sensor system. Examples for means of this kind are known to the person skilled in the art. For instance, an indicator characteristically changes color when a value exceeds or falls below a predefined limit, such as an amount of UV light. The term "sensor" refers to a technical component known to the person skilled in the art that can detect specific physical, mechanical and/or chemical properties. The term "sensor system" refers to the application of sensors for measuring and/or checking changes in environmental, biological and/or technical systems.

In an alternative embodiment of the disclosure, the sensor may be a nanosensor and/or a microsensor. Nanosensors and microsensors are known to the person skilled in the art.

In an embodiment of the disclosure, the characteristic property may be translucence, light absorption, light reflection, viscosity, acceleration, speed, elasticity, stiffness, temperature, moisture content, electrical conductivity, pressure force, compressive load, tensile load, pre-load, porosity, weight, brittleness, thickness and/or density. Moreover, other properties not listed here can be obtained using the means.

Translucence, such as due to holes having formed in the material, can be detected indirectly using a camera, a CCD sensor, a photodiode and/or a photocell. Moreover, one can conclude that holes have formed in the same material and locate them based on a change in electrical resistance of an electrically conductive material.

Acceleration can be registered using an acceleration sensor, a gyroscope and/or a high-resolution camera system.

The temperature, in particular the temperature difference, can be registered using a thermoelectric sensor, i.e. a thermocouple with or without an amplifier, a thermometer and/or an indicator, for example.

The compressive load reflects how often and/or how long the protective cover was compressed and how high the minimum and/or maximum compressive load was. The compressive load may be registered using a pressure sensor, a spring scale, a lever balance and/or a manometer.

The tensile load of the protective cover can be registered using a strain lever and/or a strain gauge, for example.

The pre-load can be registered using a pressure sensor and/or a high-resolution camera system, for example.

Brittleness, porosity and/or density can be registered using X-rays, ultrasound and/or weak gamma radiation, such as the isotope method, for example. Moreover, thickness can be registered using a measuring unit, such as a measuring tape.

Furthermore, the state of the protective cover may be selected from the list of remaining useful life, state of health, wear, existence of damage and/or imminence of a maintenance interval.

In yet another embodiment, the protective cover may comprise at least one length-adjustable protective cover element, a support frame, at least one frame element and/or a length-adjustable restraining element.

Moreover, the protective cover may additionally comprise an end frame which is suitable for attaching the protective cover to a machine or machine tool. Furthermore, the protective cover may have at least one guide rail, preferably multiple guide rails, which are configured in such a manner that at least one frame element can be movably mounted on them. Furthermore, other elements of the protective cover may be movably mounted on the guide rail.

Other details, features and advantages of the disclosure are apparent from the following description of preferred embodiments in connection with the dependent claims. The respective features can be realized individually or in combination with each other. The invention is not limited to the embodiments. The embodiments are schematically illustrated in the figures. Identical reference signs in the individual figures designate similar elements, elements of similar functions or elements corresponding in terms of function.

Figure 1:
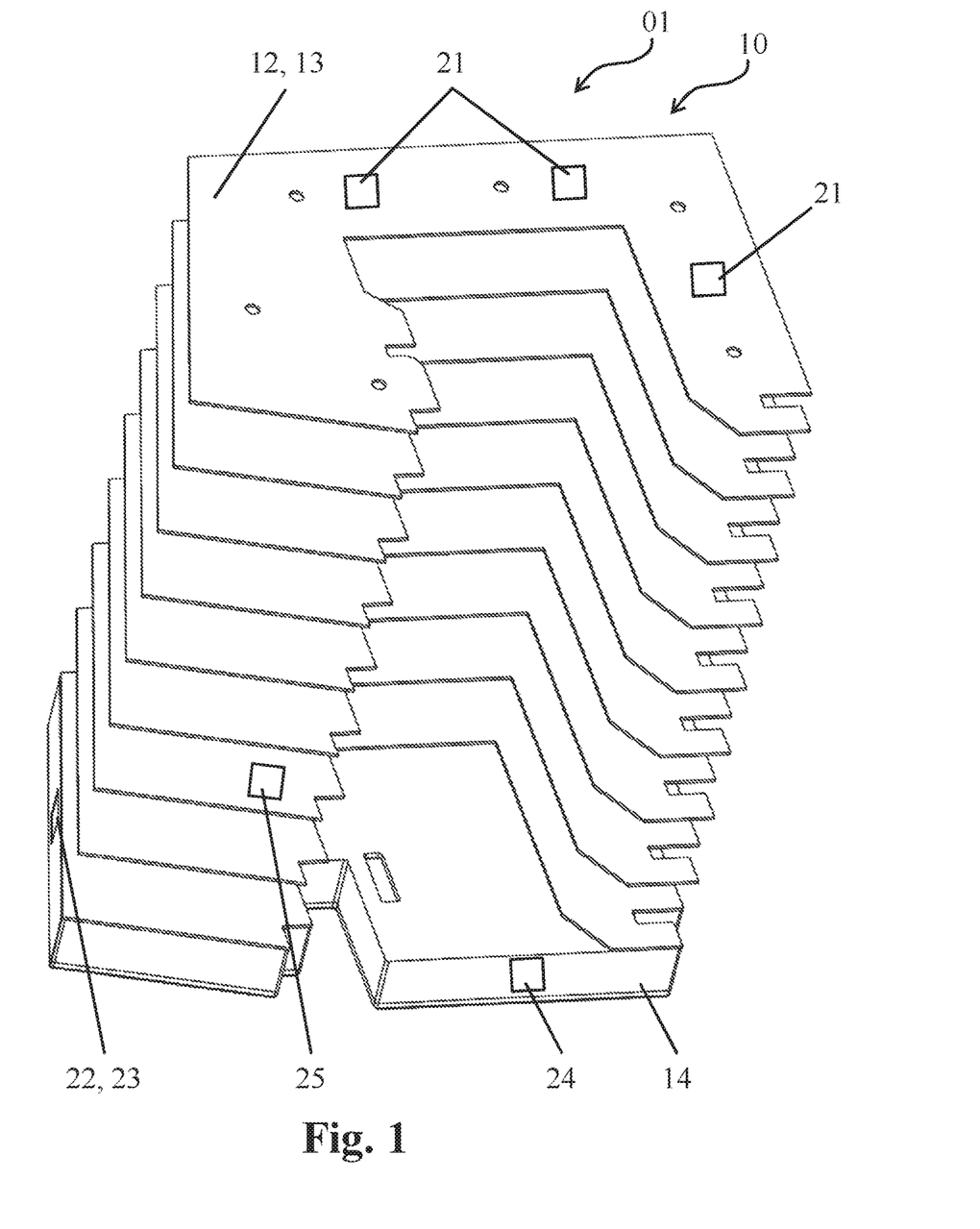
FIG. 1 is an isometric illustration of a device and protective cover according to the disclosure for determining and/or monitoring the state of the protective cover.

The isometric illustration of FIG. 1 shows a device 01 according to the disclosure for determining and/or monitoring the state of a protective cover 10, 12, 13, 14. As shown in FIG. 1, device 01 according to the disclosure has multiple sensors 21, 25, such as three pressure sensors 21 and a vibration sensor 25, on a support frame 12, which typically comprises multiple frame elements 13. An acceleration sensor 24 and a temperature and/or humidity sensor 22, 23 are located on end frame 14.

Figure 2:
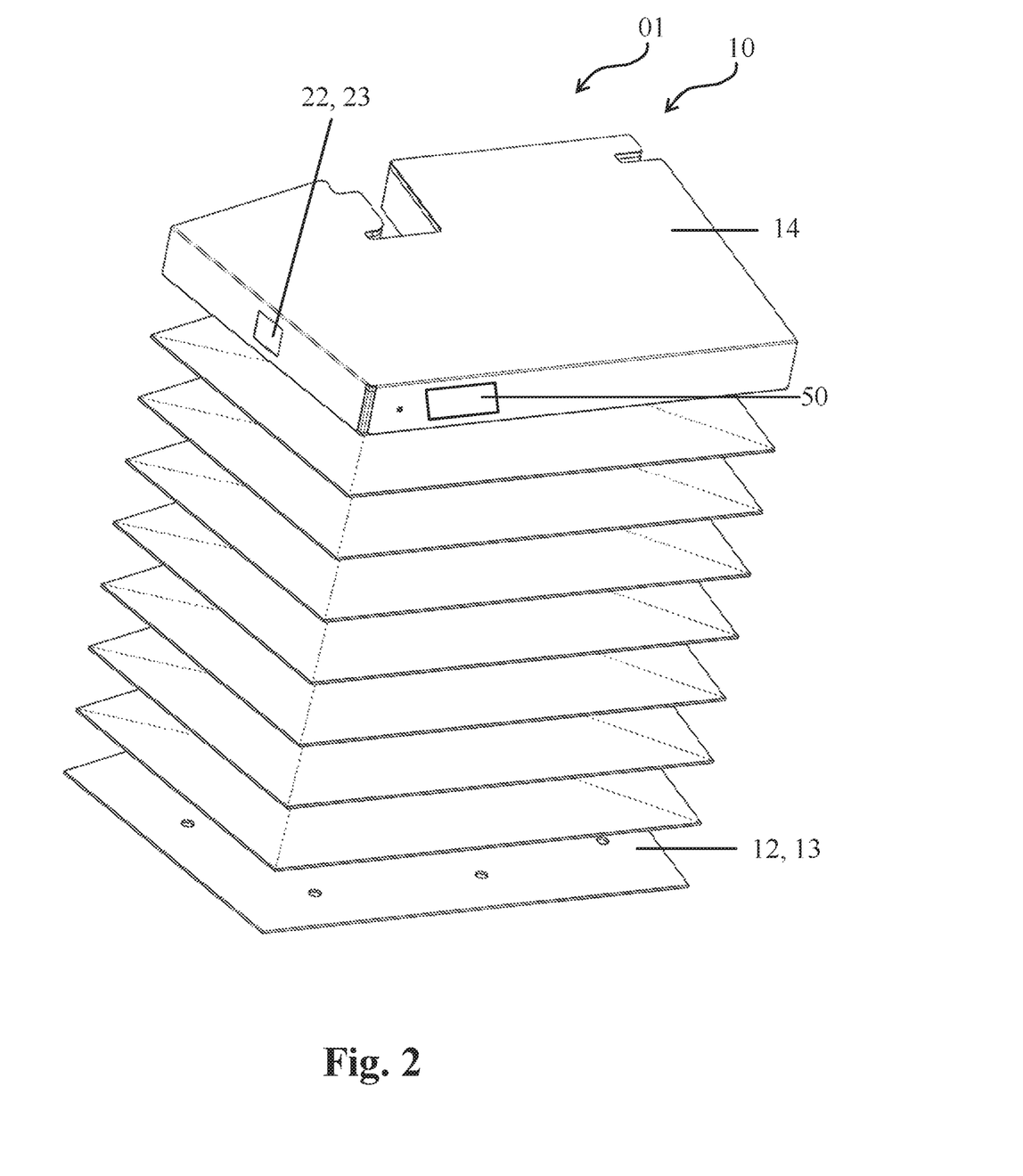
FIG. 2 is an alternative isometric illustration of a device and protective cover according to the disclosure.

FIG. 2 shows an alternative isometric illustration of a device 01 according to the disclosure for determining and/or monitoring the state of a protective cover 10, 12, 13, 14. As shown in FIG. 2, this protective cover 10, 12, 13, 14 also has a support frame 12 comprising multiple frame elements 13. A temperature and/or humidity sensor 22, 23 and an output unit 50 are located on end frame 14.

Figure 3:
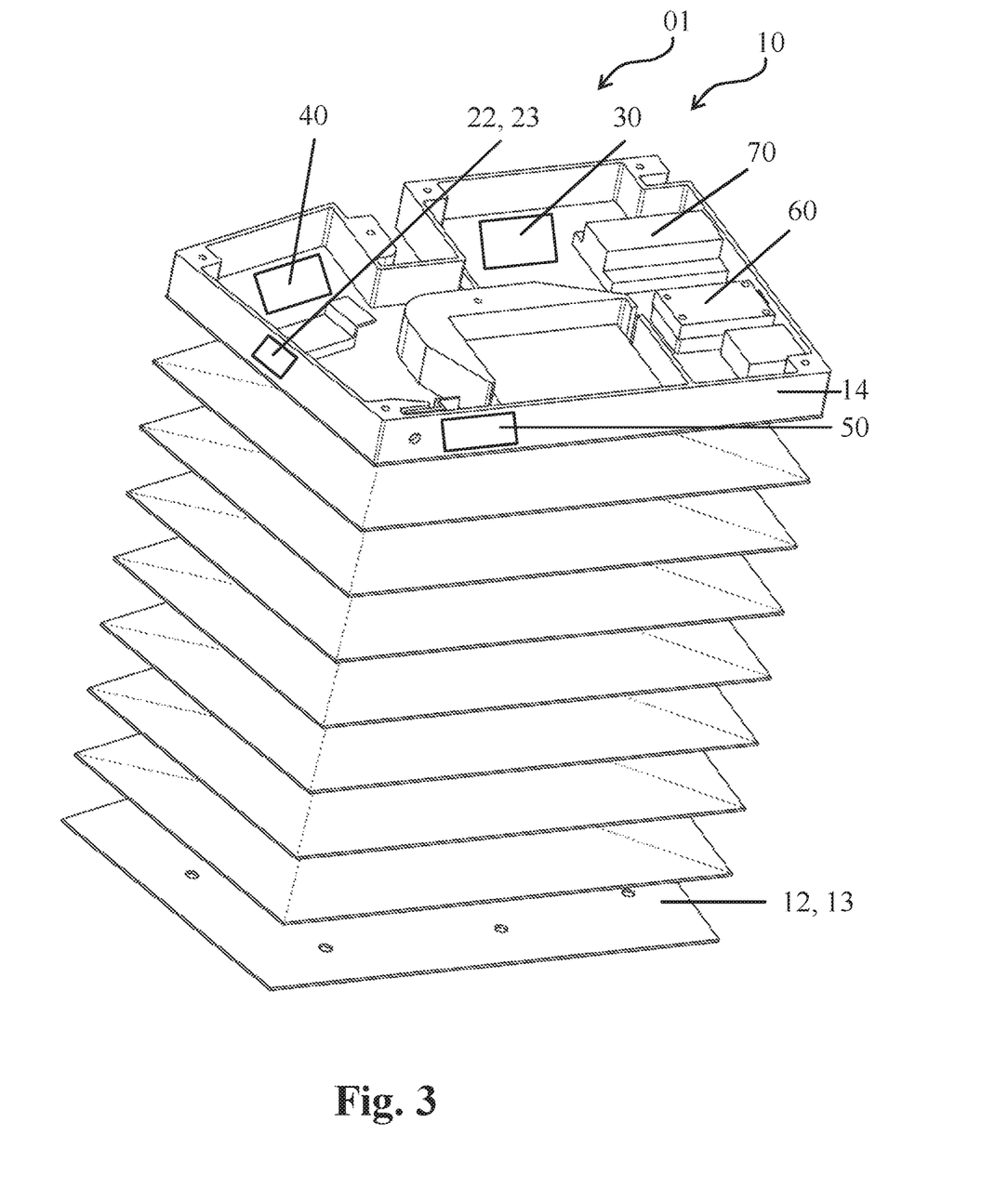
FIG. 3 is another alternative isometric illustration of a device and protective cover according to the disclosure.

FIG. 3 shows another alternative isometric illustration of a device 01 according to the disclosure for determining and/or monitoring the state of a protective cover 10, 12, 13, 14. FIG. 3 substantially corresponds to FIG. 2, with the exception that end frame 14 is illustrated in the open state so as to show the interior of the installation space for the various sensor and sensor system components.

As seen in FIG. 3, end frame 14 has a temperature and/or humidity sensor 22, 23 and an output unit 50 on the outside, as also illustrated in FIG. 2. Furthermore, FIG. 3 shows that an evaluation unit 30, an analysis unit 40, a wired and/or wireless power supply, such as a battery 60, and a transmitter and/or receiver unit 70 for wired and/or wireless data transmission are disposed within end frame 14. Understandably, evaluation and/or analysis unit 30, 40 may also be disposed in one component. Additionally, FIG. 3 shows a support frame 12, which comprises multiple frame elements 13.

Figure 4:
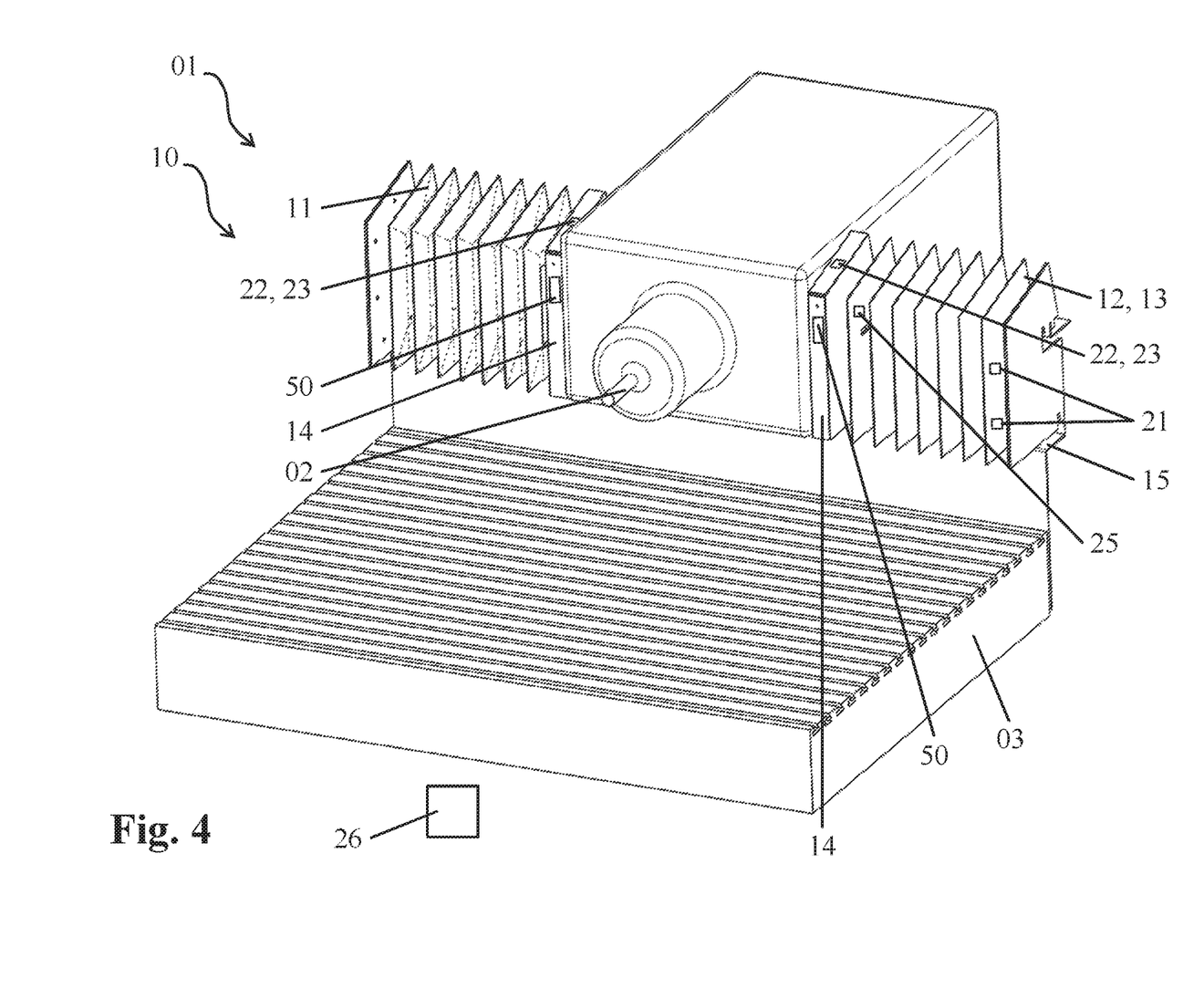
FIG. 4 is an isometric illustration of a device and protective cover according to the disclosure along with a machine tool to be protected.

FIG. 4 shows an isometric illustration of a device 01 according to the disclosure for determining and/or monitoring the state of a protective cover 10, 11, 12, 13, 14, 15 that serves to cover moving machine parts or the like. Additionally, FIG. 4 shows a tool 02 and a table 03.

As FIG. 4 clearly shows, protective cover 10, 11, 12, 13, 14, 15 comprises a support frame 12, which further comprises multiple frame elements 13. Moreover, protective cover 10, 11, 12, 13, 14, 15 has a length-adjustable protective cover element 11 in order to protect the machine parts against external influences and to seal it against the environment both in the extended state and in the retracted state.

As is also visible, frame elements 13 are movably mounted on a guide rail 15. As shown in FIG. 4, end frame 14 serves to attach protective cover 10, 11, 12, 13, 14, 15 to the machine tool.

Device 01 according to the disclosure has multiple means 21, 22, 23, 24, 25, 26 for determining and/or monitoring the state of protective cover 10, 11, 12, 13, 14, 15. For instance, FIG. 4 shows that a temperature and/or humidity sensor 22, 23 and an output unit 50 are disposed on end frame 14. As further shown, two pressure sensors 21 and a vibration sensor 25 are disposed on support frame 12 and/or on a frame element 13. As is also visible, another means 26, in particular a camera 26, is disposed outside of device 01 according to the disclosure.

The invention claimed is:

1. A method for determining and/or monitoring the state of a protective cover, the method comprising the steps of
   a) obtaining a first state value of at least one characteristic physical, mechanical and/or chemical property of the protective cover at a first point in time; and
   b) obtaining a second state value of the at least one characteristic property of the protective cover at a second point in time, which is subsequent to the first point in time; and
   c) comparing the obtained state values; and
   d) determining the state of the protective cover based on the comparison performed in step c), wherein the characteristic property is translucence, light absorption, light reflection, viscosity, acceleration, speed, elasticity, stiffness, temperature, moisture content, electrical conductivity, pressure force, compressive load, tensile load, pre-load, porosity, weight, brittleness, thickness and/or density, and wherein the protective cover comprises at least one length-adjustable protective cover element, a support frame, at least one frame element and/or a length-adjustable restraining element.

2. The method according to claim 1, wherein the method additionally comprises a step of
   e) displaying the determination performed in step d).

3. The method according to claim 1, wherein the method comprises an additional step b1) after step b):
   b1) obtaining a third state value of the at least one characteristic property of the protective cover at a third point in time, which is subsequent to the second point in time.

4. The method according to claim 1, wherein the first state value of the characteristic property is a reference value.

5. The method according to claim 1, wherein the first, the second and/or a third state value are obtained under substantially similar conditions.

6. The method according to claim 1, wherein the first, the second and/or a third state value are obtained under different conditions.

7. The method according to claim 1, wherein the state of the protective cover is selected from the list of remaining useful life, state of health, wear, existence of damage and/or imminence of a maintenance interval.

8. A device for determining and/or monitoring the state of a protective cover, the device comprising
   a) a means for obtaining a first state value of at least one characteristic physical, mechanical and/or chemical property of the protective cover at a first point in time; and
   b) a means for obtaining a second state value of the at least one characteristic property of the protective cover at a second point in time, which is subsequent to the first point in time; and
   c) an evaluation unit for comparing the obtained state values; and
   d) an analysis unit for determining the state of the protective cover based on the comparison performed in item c), wherein the means for obtaining the first state value and the means for obtaining the second state value each register translucence, light absorption, light reflection, viscosity, acceleration, speed, elasticity, stiffness, temperature, moisture content, electrical conductivity, pressure force, compressive load, tensile load, pre-load, porosity, weight, brittleness, thickness and/or density, and wherein the protective cover comprises at least one length-adjustable protective cover element, a support frame, at least one frame element and/or a length-adjustable restraining element.

9. The device according to claim 8, wherein the device additionally comprises
   e) an output unit for displaying the determination performed in item d).

10. The device according to claim 8, wherein the device comprises an additional item b1) after item b):
    b1) a means for obtaining a third state value of the at least one characteristic property of the protective cover at a third point in time, which is subsequent to the second point in time.

11. The device according to claim 8, wherein the first state value of the characteristic property is a reference value.

12. The device according to claim 8, wherein the means, the evaluation unit, the analysis unit and/or the output unit are partially or fully integrated in the protective cover.

13. The device according to claim 8, wherein the means, the evaluation unit, the analysis unit and/or the output unit are disposed outside the protective cover and are rigged for non-contact or contact action.

14. The device according to claim 8, wherein the means is a counting mechanism, an operating time counter, a sensor and/or a sensor system.

15. The device according to claim 14, wherein the sensor is a nanosensor and/or a microsensor.

16. The device according to claim 8, wherein the state of the protective cover is selected from the list of remaining useful life, state of health, wear, existence of damage and/or imminence of a maintenance interval.

* * * * *

UNITED STATES PATENT AND TRADEMARK OFFICE
CERTIFICATE OF CORRECTION

PATENT NO. : 11,298,789 B2
APPLICATION NO. : 16/477059
DATED : April 12, 2022
INVENTOR(S) : Thomas Kreutzer et al.

Page 1 of 1

It is certified that error appears in the above-identified patent and that said Letters Patent is hereby corrected as shown below:

On the Title Page

Item (57) ABSTRACT
Line 8, "is to subsequent" should be --is subsequent--.

In the Specification

Column 1, Line 37, "typically to accompanied" should be --typically accompanied--.

Column 2, Line 7, "and to the" should be --and the--.

Signed and Sealed this
Seventh Day of June, 2022

Katherine Kelly Vidal
*Director of the United States Patent and Trademark Office*